United States Patent
Yang et al.

(10) Patent No.: US 9,074,748 B2
(45) Date of Patent: Jul. 7, 2015

(54) BACKLIGHT MODULE

(71) Applicant: AU Optronics Corp., Hsin-Chu (TW)

(72) Inventors: Meng-Jung Yang, Hsin-Chu (TW);
Yi-Chun Lin, Hsin-Chu (TW);
Chun-Wei Chiang, Hsin-Chu (TW);
Jung-Hui Hsu, Hsin-Chu (TW);
Chih-Wei Chang, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 175 days.

(21) Appl. No.: 13/726,558

(22) Filed: Dec. 25, 2012

(65) Prior Publication Data

US 2013/0336003 A1 Dec. 19, 2013

(30) Foreign Application Priority Data

Jun. 14, 2012 (TW) .............................. 101121310 A

(51) Int. Cl.
 *G02B 6/42* (2006.01)
 *F21V 9/00* (2015.01)
 *F21V 8/00* (2006.01)

(52) U.S. Cl.
 CPC ... *F21V 9/00* (2013.01); *G02B 6/42* (2013.01); *G02B 6/0023* (2013.01); *G02B 6/0091* (2013.01)

(58) Field of Classification Search
 CPC ...... G02B 6/4215; G02B 6/42; G02B 6/0023; G02B 6/0026

USPC .................. 362/608, 612, 621, 622, 632–634
See application file for complete search history.

(56) References Cited

U.S. PATENT DOCUMENTS

| | | | |
|---|---|---|---|
| 7,891,852 B2 * | 2/2011 | Pugh et al. | 362/606 |
| 8,052,320 B2 | 11/2011 | Hamada | |
| 2007/0274096 A1 * | 11/2007 | Chew et al. | 362/609 |
| 2010/0283914 A1 | 11/2010 | Hamada | |
| 2011/0141769 A1 * | 6/2011 | Lee et al. | 362/629 |

FOREIGN PATENT DOCUMENTS

| | | |
|---|---|---|
| CN | 101918757 A | 12/2010 |
| CN | 102330920 A | 1/2012 |

* cited by examiner

*Primary Examiner* — Julie Bannan
(74) *Attorney, Agent, or Firm* — Winston Hsu; Scott Margo

(57) ABSTRACT

A backlight module is disclosed in the present invention. The backlight module includes a light guiding plate, a light source, a transformer and a constrainer. The transformer is disposed between the light guiding plate and the light source. The transformer is for transforming a first beam emitted from the light source into a second beam, so as to transmit the second beam to the light guiding plate, wherein a spectrum of the first beam is different from a spectrum of the second beam. The constrainer is connected to the light source for constraining a movement of the transformer. The constrainer includes a first fixing portion disposed on the light source and a second fixing portion connected to the first fixing portion, the second fixing portion being disposed on the transformer to fix the transformer relative to the light source.

18 Claims, 8 Drawing Sheets

BACKLIGHT MODULE

BACKGROUND OF THE INVENTION

1. Field of the Invention

The present invention relates to a backlight module, and more particularly, to a backlight module with high positioning precision and assembly convenience.

2. Description of the Prior Art

In order to enhance saturation of the display device and relatively adjust a spectrum of the backlight module, except for adopting a light emitting diode with tricolor, phosphor powders with high saturation can be utilized for transforming spectrum, so as to enhance level of color range. The phosphor powders have disadvantages of rapid decay and short life. Except for improving property of the phosphor powders to solve above drawbacks, it can reduce heat transmitted to the phosphor powders for enhancing life thereof. As a result, the issue of how to dispose the phosphor powders and the light source arise arises. A conventional solution is to make the phosphor powders as an optical film for easy assembly in the backlight module. However, it enhances complexity of assembly, expensive cost of manufacture, and the phosphor powders in a type of optical film is easy polluted, such as humid, oxidation and so on. Thus, Structures capable of separating the phosphor powders from the light source and providing the phosphor powders with better protection and humid proof become an issue of the backlight module.

SUMMARY OF THE INVENTION

The present invention provides a backlight module with high positioning precision for solving above drawbacks.

According to a preferred embodiment of the present invention, a backlight module includes a light guiding plate, a light source, a transformer and a constrainer. The transformer is disposed between the light guiding plate and the light source. The transformer is for transforming a first beam emitted from the light source into a second beam, so as to transmit the second beam to the light guiding plate, wherein a spectrum of the first beam is different from a spectrum of the second beam. The constrainer is connected to the light source for constraining a movement of the transformer. The constrainer includes a first fixing portion disposed on the light source and a second fixing portion connected to the first fixing portion, the second fixing portion being disposed on the transformer to fix the transformer relative to the light source.

According to another preferred embodiment of the present invention, the first fixing portion is a sunken structure for buckling the light source, and the second fixing portion includes two constraining blocks for respectively abutting against two opposite lateral surfaces of the transformer in a tight fit manner. The constrainer is a buckling structure made of resilient materials for buckling the light source and a section of the transformer in a resiliently bending manner.

According to another preferred embodiment of the present invention, the first fixing portion is a protrusion embedded in a slot of the light source. The second fixing portion is an arc-shaped slot, a curvature of the arc-shaped slot is substantially identical to a curvature of an edge of the transformer, and the arc-shaped slot abuts against the edge of the transformer for clamping the transformer cooperatively with a base of the light source. The constrainer is made of heat conductive materials, and the constrainer is combined with the light source and the transformer in a tight fit manner.

According to another preferred embodiment of the present invention, the first fixing portion is a plate structure fixed on the light source in a glued or screwed manner. The second fixing portion is a U-shaped structure, and the light source is accommodated inside the U-shaped structure. The constrainer and a frame of the backlight module are integrally formed.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
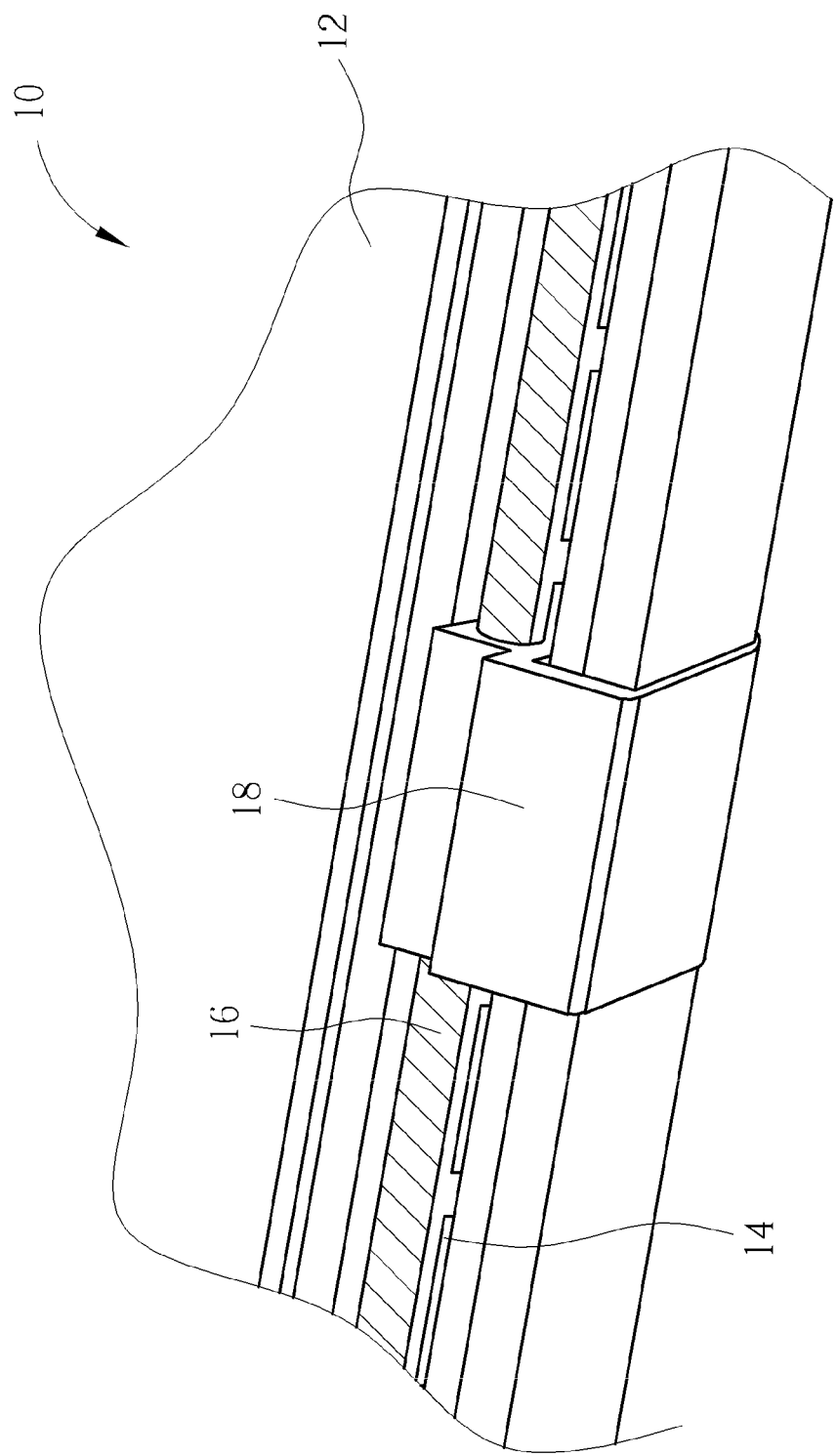
FIG. 1 is a partly schematic diagram of a backlight module according to a first embodiment of the present invention.
Figure 2:
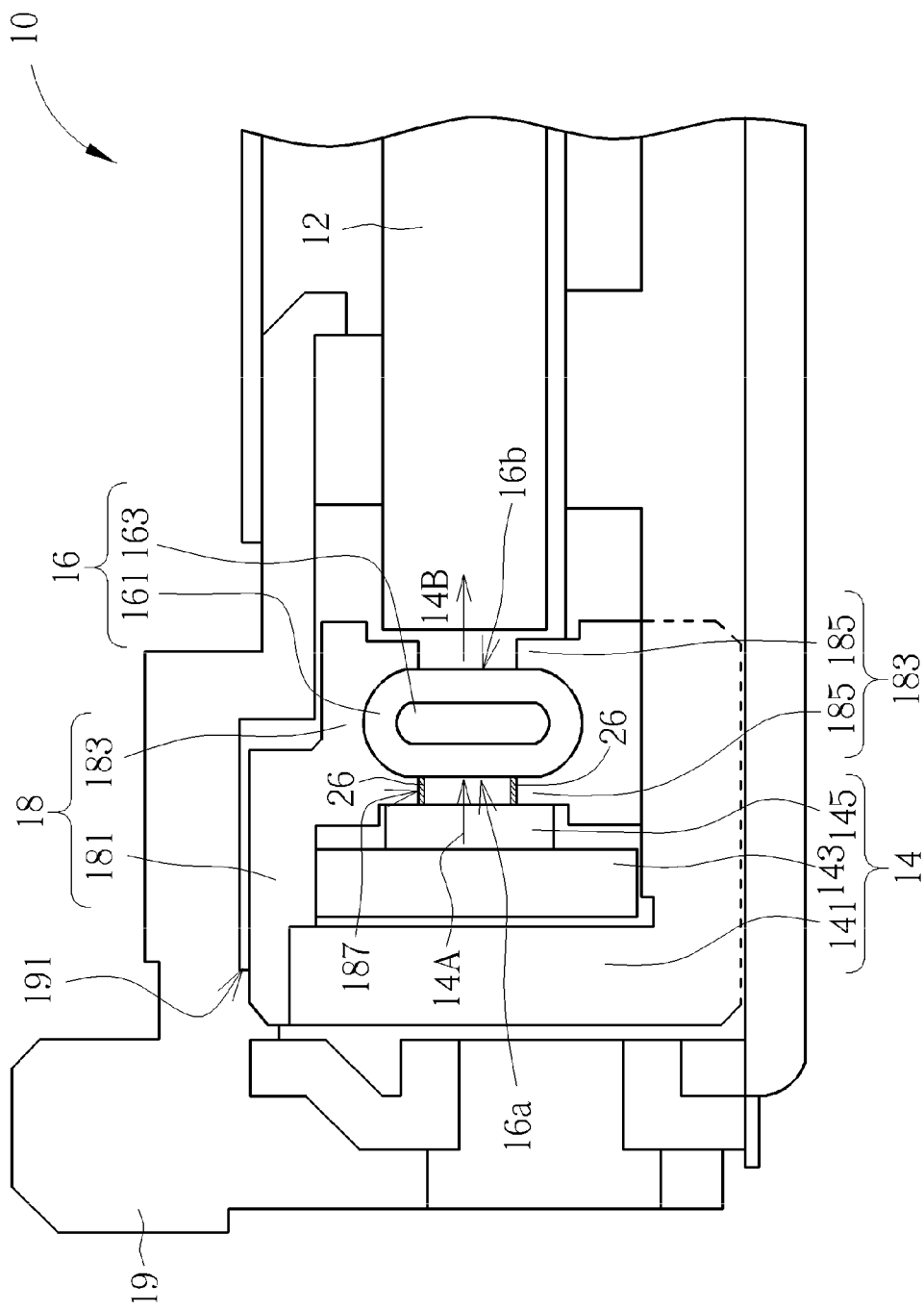
FIG. 2 is a sectional diagram of the backlight module according to the first embodiment of the present invention.

Please refer to FIG. 1 and FIG. 2. FIG. 1 is a partly schematic diagram of a backlight module 10 according to a first embodiment of the present invention. FIG. 2 is a sectional diagram of the backlight module 10 according to the first embodiment of the present invention. The backlight module 10 includes a light guiding plate 12, a light source 14, a transformer 16 and a constrainer 18. The light source 14 can include a heat dissipating component 141, a circuit board 143 and a light emitting unit 145. The light emitting unit 145 is disposed on the circuit board 143, and the circuit board 143 is connected to the heat dissipating component 141 for effectively dissipating heat generated by the light emitting unit 145 as emitting a first beam 14A. In other words, the heat dissipating component 141 and the circuit board 143 can selectively be a bridging component for assisting the constrainer 18 to be fixed on the light source 14. The backlight module 10 can further include a plastic frame 19 covering the transformer 16 and the constrainer 18 for protection. The plastic frame 19 includes a step portion 191 for being embedded with the constrainer 18 for providing the constrainer 18 with pressing constraint, so as to fix the constrainer 18. Furthermore, the plastic frame 19 further includes another structure for applying pressure on a surface of the light guiding plate 12, so as to constraint a movement of the light guiding plate 12 and to enhance structural stability of the backlight module 10.

The transformer 16 includes a light transforming component 163 and a transparent tube 161, and the light transforming component 163 is sealed inside the transparent tube 161. The light transforming component 163 can be made of phosphor powder materials or a Quantum Dots (OD). The transformer 16 is disposed between the light guiding plate 12 and the light source 14. The transformer 16 is for transforming the first beam 14A emitted from the light source 14 into a second beam 14B, so as to transmit the second beam 14B into the light guiding plate 12. For example, the first beam 14A can be a blue light which can be transformed into the second beam 14B with a spectrum of white light by nano phosphor powders, i.e. the light transforming component 163, and the second beam 14B is transmitted into the light guiding plate 12 for providing backlight to a panel. It should be mentioned that a spectrum of the first beam 14A is different from a spectrum of the second beam 14B.

The constrainer 18 is connected to the light source 14 and clamps the transformer 16 for constraining a movement of the transformer 16 relative to the light source 14. The constrainer 18 includes a first fixing portion 181 disposed on the light source 14, and two second fixing portions 183 respectively connected to two ends of the first fixing portion 181 and disposed on the transformer 16, so as to fix the transformer 16 relative to the light source 14. As shown in FIG. 1 and FIG. 2, the constrainer 18 buckles the bridging component, such as the heat dissipating component 141, of the light source 14. The first fixing portion 181 can be a sunken structure for buckling the light source 14. The second fixing portions 183 can include two constraining blocks 185 for respectively abutting against two opposite lateral surfaces of the transformer 16 in a tight fit manner. Accordingly, it can effectively prevent the transformer 16 from separating from the constrainer 18.

In this embodiment, the constrainer 18 can be a symmetric structure made of resilient material. The symmetric structure includes one first fixing portion 181 with two sunken structures buckling two edges of the light source 14, and two second fixing portions 183 with the constraining blocks 185 clamping two edges of the transformer 16. Accordingly, the constrainer 18 can be used for buckling the light source 14 and any section of the transformer 16 in a resiliently bending manner, so as to constrain the movement of the transformer 16. It should be noticed that a width of the constrainer 18 is much smaller than lengths of the light source 14 and the transformer 16, as shown in FIG. 1. Accordingly, the second fixing portions 183 only contacts part of the edge of the transformer 16 instead of completely covering the transformer 16, so as to reduce shielded area of a light-incidence side and a light-emitting side of the transformer 16, such that a maximum amount of light emitted from the light source 14, transmitted from the transformer 16 to the light guiding plate 12, can be achieved.

Figure 3:
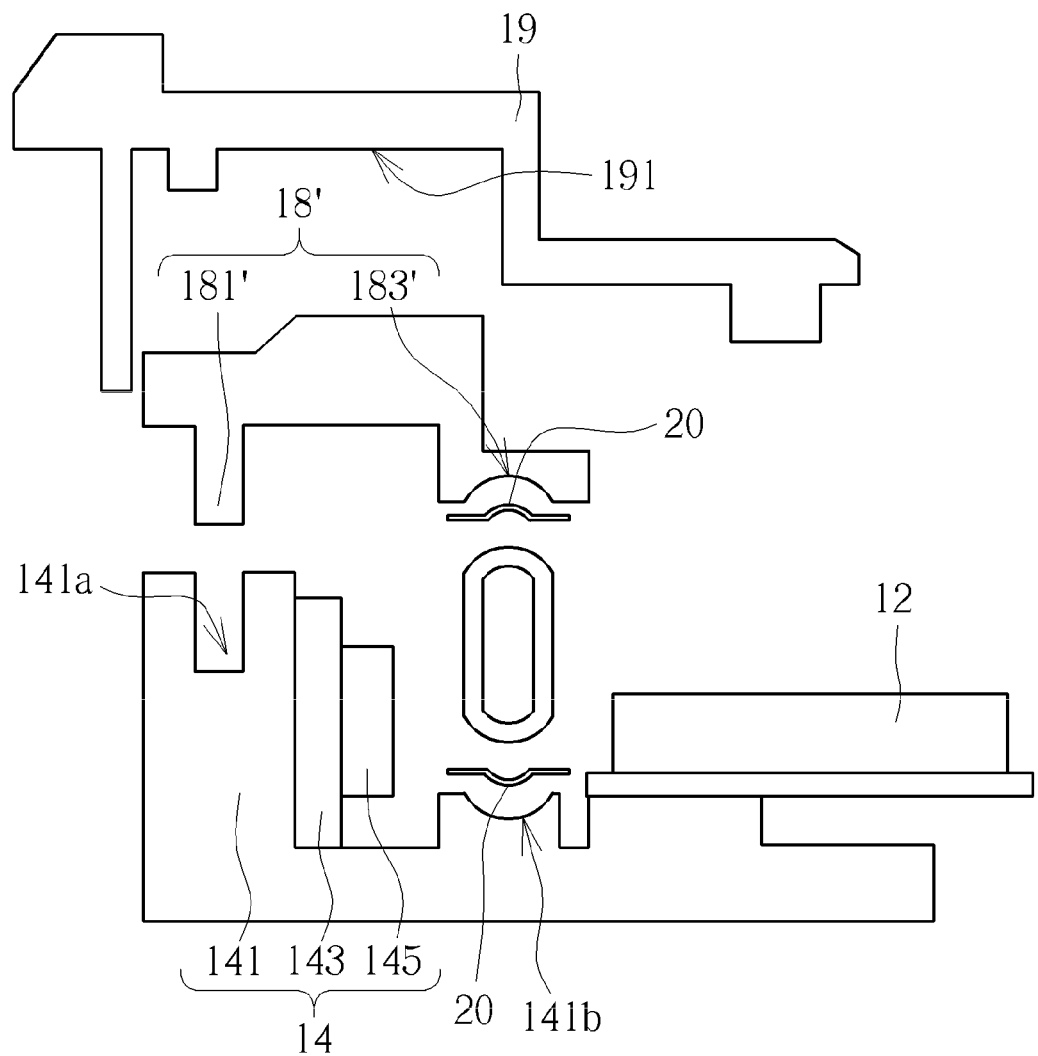
FIG. 3 and FIG. 4 are respectively diagrams of a backlight module in different assembling processes according to a second embodiment of the present invention.
Figure 4:
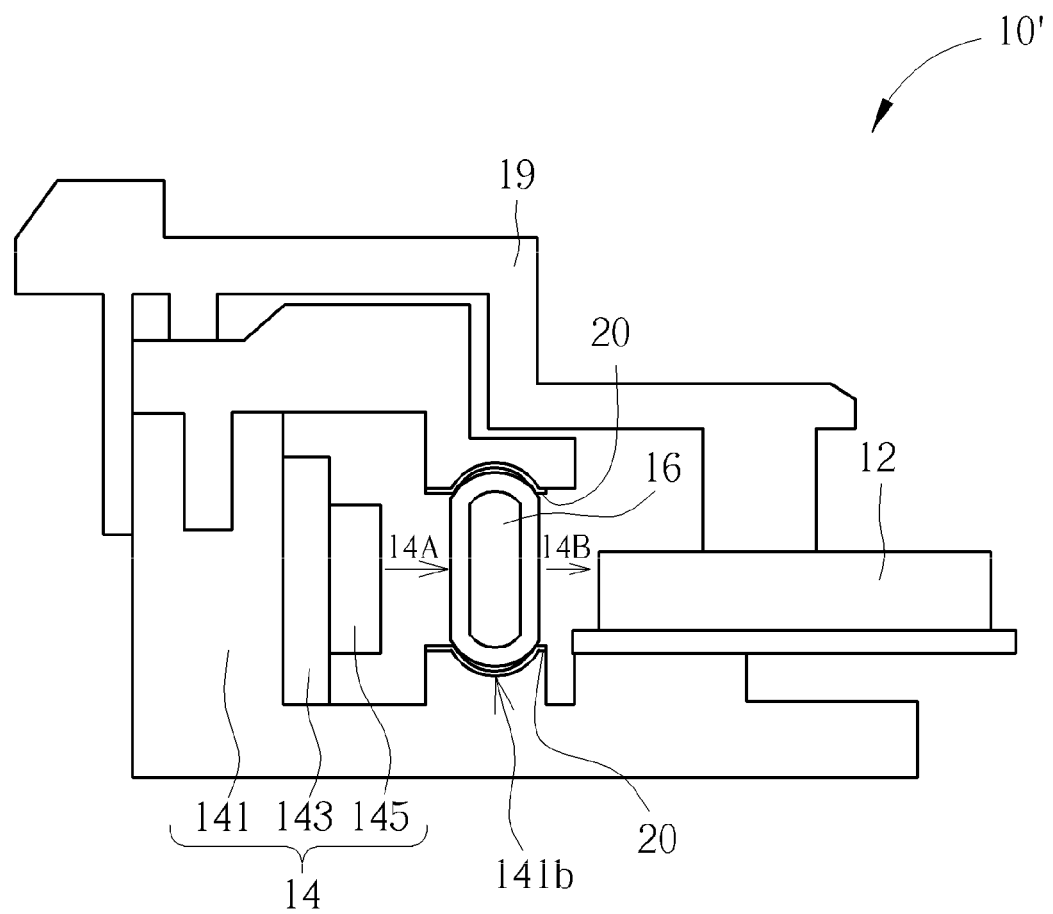

Please refer to FIG. 3 and FIG. 4. FIG. 3 and FIG. 4 are respectively diagrams of a backlight module 10' in different assembling processes according to a second embodiment of the present invention. The backlight module 10' includes the light guiding plate 12, the light source 14, the transformer 16 and a constrainer 18'. The components in the second embodiment with denotes identical to those in the first embodiment have the same structures and functions, and further descriptions are omitted herein for simplicity. The main difference between the second embodiment and the first embodiment is that a first fixing portion 181' of the constrainer 18' of the backlight module 10' is a protrusion embedded in a slot 141a of the light source 14, and a second fixing portion 183' of the constrainer 18' is an arc-shaped slot with a curvature substantially identical to a curvature of the edge of the transformer 16. As the first fixing portion 181, i.e. the protrusion, is embedded in the slot 141a, the arc-shaped slot abuts against the edge of the transformer 16 for clamping the transformer 16 cooperatively with a base 141b of the light source 14. It should be noticed that the above-mentioned structures of the first fixing portion 181' and the light source 14 are not limited to those mentioned in this embodiment. For example, the first fixing portion 181' can be a slot sheathing on a protrusion of the light source 14. Engaging structures with tightly fitting function are within the scopes of the first fixing portion and the corresponding component of the present invention, and further descriptions are omitted herein for simplicity.

In the second embodiment, the constrainer 18' can be selectively made of heat conductive material, and the constrainer 18' is combined with the heat dissipating component 141 of the light source 14 via the first fixing portion 181' in a tight fit manner, so as to constrain the movement of the transformer 16 relative to the light source 14. In order to prevent an light-incidence side 16a and an light-emitting side 16b of the transformer 16 from over shielding, resulting in blocking a light path from the light source 14 to the light guiding plate 12 through the transformer 16, the second fixing portion 183' of the constrainer 18' in the second embodiment contacts part of the edge of the transformer 16. As a result, the present invention utilizes pressure generated by combination of the first fixing portion 181' and the light source 14 to press the transformer 16 by the second fixing portion 183', and to cooperate with the base 141b for clamping the transformer 16. In addition, the backlight module 10' in the second embodiment can further include a reflective component 20 disposed between the second fixing portion 183' and the transformer 16. As the first beam 14A deviates due to divergence, the first beam 14A is not completely transmitted through the transformer 16. Part of the deviating first beam 14A is projected to a periphery of the transformer 16 and thus reflected by the reflective component 20. As a result, it can enhance lightness of the backlight module 10' and stability of spectrum transformation.

Figure 5:
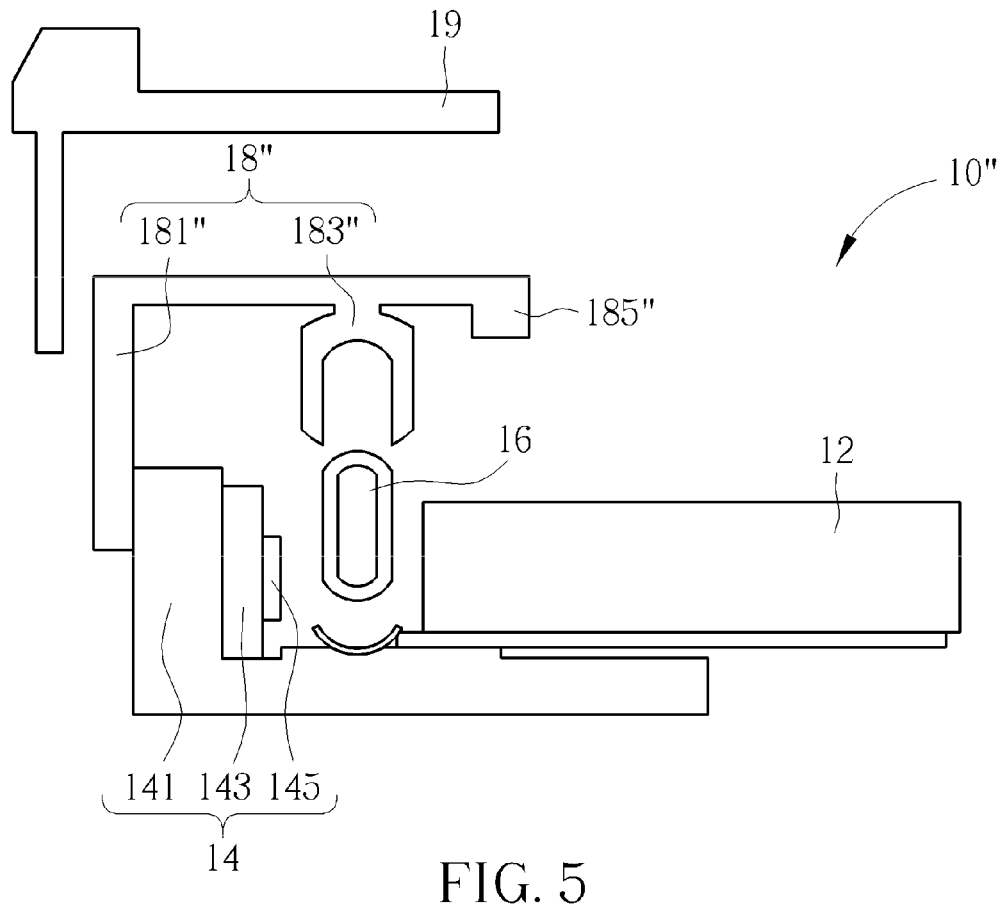
FIG. 5 and FIG. 6 are respectively diagrams of a backlight module in different assembling processes according to a third embodiment of the present invention.
Figure 6:
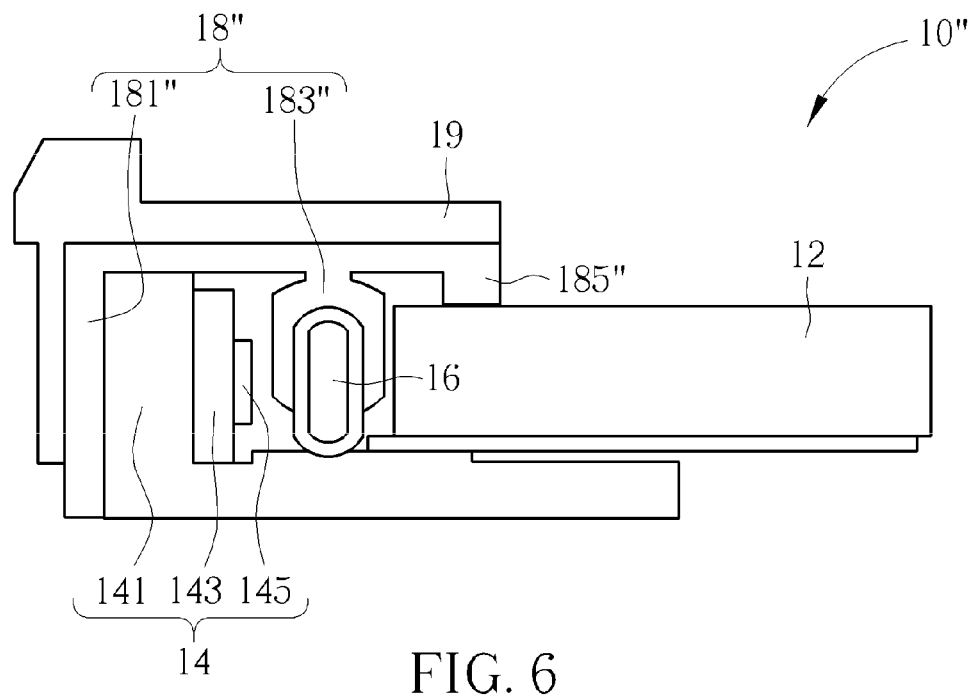
Figure 7:
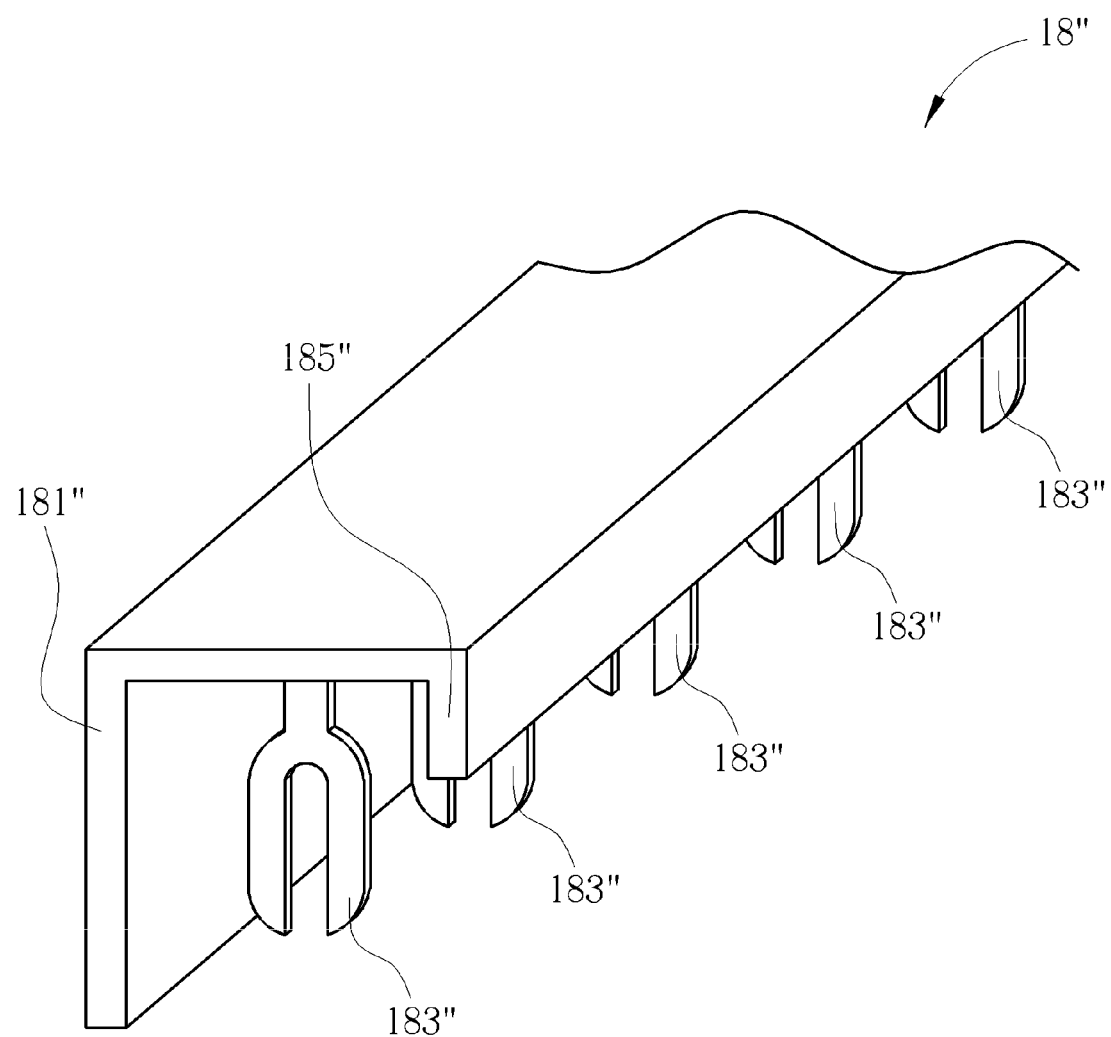
FIG. 7 is a schematic diagram of a constrainer according to the third embodiment of the present invention.
Figure 8:
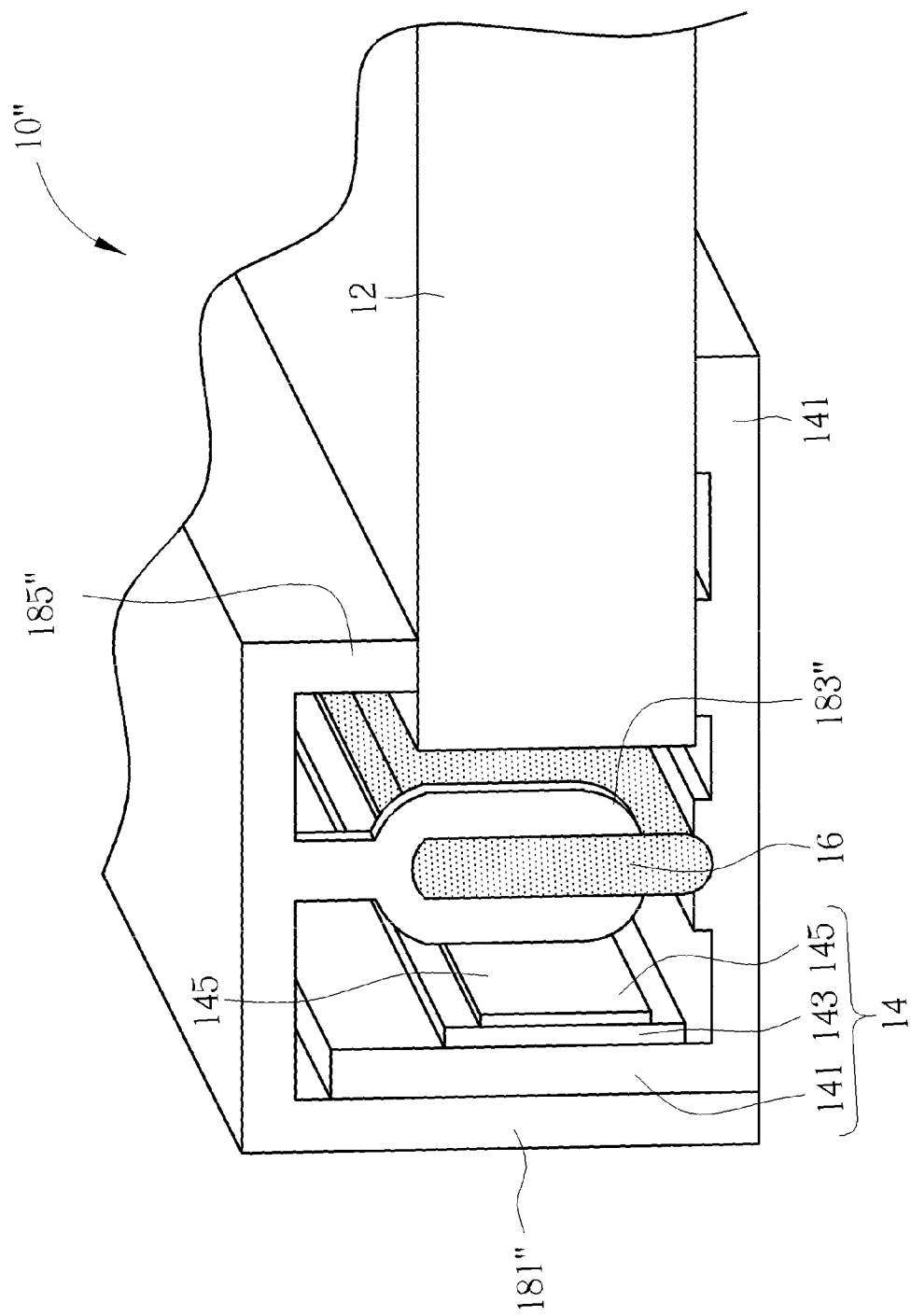
FIG. 8 is an assembly diagram of the backlight module according to the third embodiment of the present invention.

Please refer to FIG. 5 and FIG. 6. FIG. 5 and FIG. 6 are respectively diagrams of a backlight module 10" in different assembling processes according to a third embodiment of the present invention. The backlight module 10" includes the light guiding plate 12, the light source 14, the transformer 16 and a constrainer 18". Please refer to FIG. 7 and FIG. 8. FIG. 7 is a schematic diagram of the constrainer 18" according to the third embodiment of the present invention. FIG. 8 is an assembly diagram of the backlight module 10" according to the third embodiment of the present invention. The components in the third embodiment with denotes identical to those in the aforesaid embodiments have the same structures and functions, and further descriptions are omitted herein for simplicity. The main difference between the third embodiment and the aforesaid embodiments is that the first fixing portion 181" of the constrainer 18" of the backlight module 10" is a plate structure selectively fixed on the heat dissipating component 141 of the light source 14 in a glued or screwed manner, and a second fixing portion 183" of the constrainer 18" is a U-shaped structure for covering the transformer 16, so as to constrain the movement of the transformer 16 relative to the light source 14.

As shown in FIG. 7 and FIG. 8, the backlight module 10" can further include a plurality of light sources 14, and the constrainer 18" can further include a plurality of second fixing portions 183". Since the transformer 16 can be completely accommodated inside the U-shaped structure, each of the second fixing portions 183" sheathes on the transformer 16 in a position aligned with a gap between the two adjacent light sources 14, so as to prevent the light path from each light source 14 to the light guiding plate 12 through the transformer 16 from blocking. Compared to the aforesaid embodiments, the constrainer 18" in the third embodiment is integrated with a frame (not shown in figures) of the backlight module 10" monolithically. In such a manner, it can reduce the components of the backlight module 10" and simplify assembly process thereof. As assembling the backlight module 10" in the third embodiment, the transformer 16 can be disposed inside the U-shaped structure of the second fixing portions 183". Then, the circuit board 143 and the light emitting unit 145 can be disposed on the heat dissipating component 141 to be the light source 14. Finally, the constrainer 18" can be fixed on the heat dissipating component 141, so as to complete assembly of the backlight module 10".

As shown in FIG. 5 to FIG. 8, the constrainer 18" can further include a third fixing portion 185" connected to the first fixing portion 181". In other words, the first fixing portion 181" is a main body of the constrainer 18", and the second fixing portions 183" and the third fixing portion 185" are both connected to the main body to form the constrainer 18" with multifunction. As the constrainer 18" is engaged with the light source 14 and the transformer 16, the third fixing portion 185" is used for abutting against an upper surface of the light guiding plate 12 and cooperating with the heat dissipating component 141 disposed on a bottom surface of the light guiding plate 12 for providing a reliable clamping mechanism. The implement of the third fixing portion 185" is not limited to the constrainer 18" in the third embodiment. For example, the third fixing portion can be adapted to the backlight modules illustrated in the first embodiment and in the second embodiment as well. The configuration is the same as that mentioned above, and further description is omitted herein for simplicity.

Figure 9:
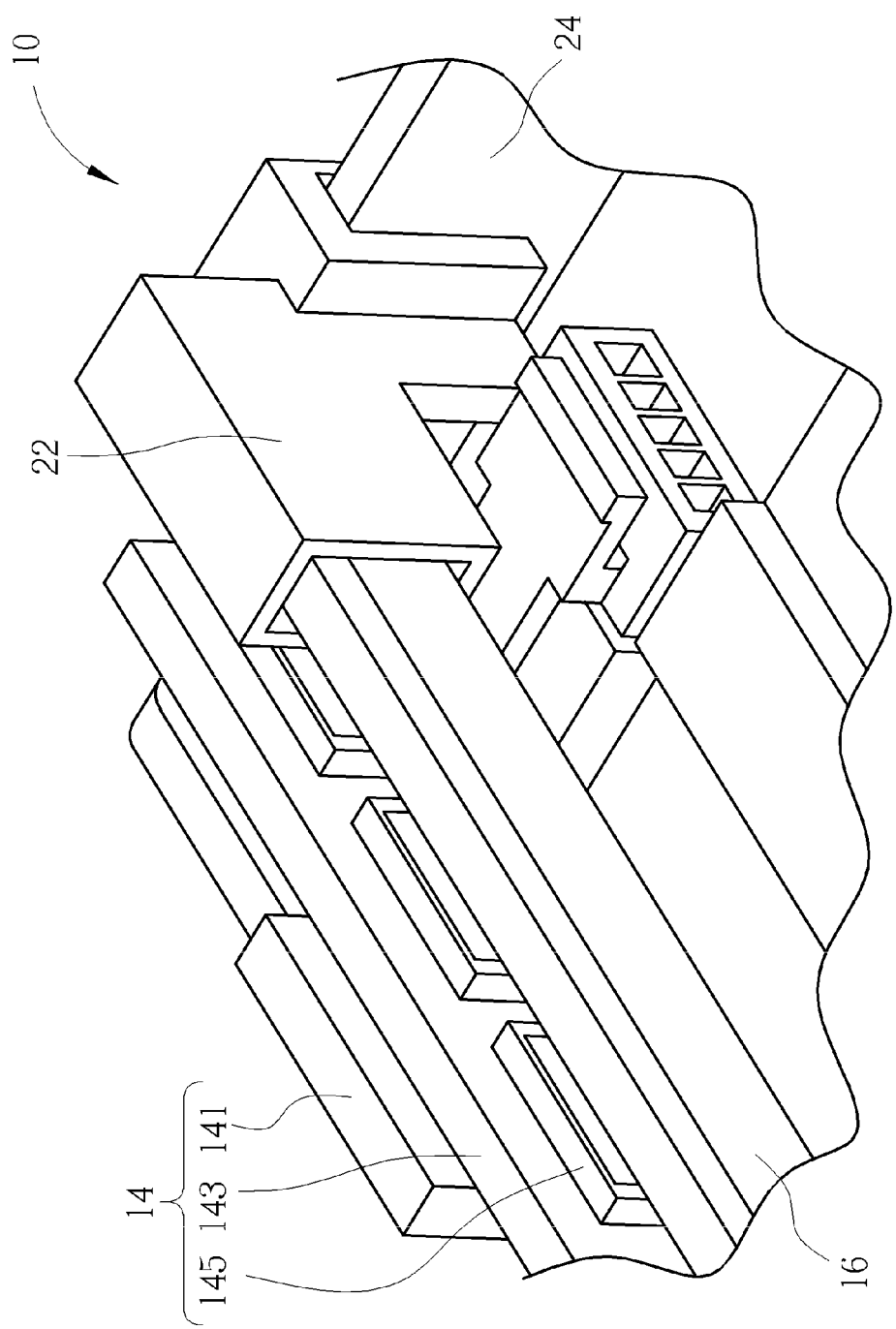
FIG. 9 is a partly diagram of the backlight module according to the first embodiment of the present invention.

In addition, the constrainer 18 of the present invention can further include a sheathing portion 22. Please refer to FIG. 9. FIG. 9 is a partly diagram of the backlight module 10 according to the first embodiment of the present invention. The sheathing portion 22 can selectively sheathe on an end of the transformer 16 and be simultaneously disposed a back cover 24 of the backlight module 10. In the first embodiment, the second fixing portions 183 of the constrainer 18 clamps middle section of the transformer 16 for constraint. Accordingly, the present invention preferably includes two sheathing portions 22 disposed on two ends of the transformer 16, so as to fix the transformer 16 on the lateral sides of the light source 14 more reliably. Furthermore, a reflective film 26 can be coated on an inner surface 187 of the constrainer 18 near the light source 14 in the present invention. As shown in FIG. 2, the reflective film 26 can be coated on an upper inner surface and on the bottom inner surface of the constrainer 18. The function of the reflective film 26 is the same as the aforesaid reflective component 20, i.e. the reflective component 20 is used for reflecting part of the deviating first beam 14A, so as to enhance lightness of the backlight module 10. The reflective component 20, the sheathing portion 22 and the reflective film 26 can be implemented in any of the embodiments of the present invention, and depend on actual demand.

In summary, the light transforming component is sealed inside the transparent tube to form the transformer of the present invention for enhancing life of the phosphor powders for transforming spectrums. The transformer is spaced from the light source, i.e. the transformer does not contact the light source, so as to insulate the transformer from heat transmission. Thus, it can enhance life of the transformer. The present invention further utilizes the constrainer to fix the light source relative to the transformer, so as to effectively constrain the movement of the transformer relative to the light source. Accordingly, it can enhance transformation rate and spectrum range. In the first embodiment, the constrainer is a buckling structure made of resilient material. Two ends of the buckling structure, i.e. a position whereon the second fixing portion is disposed, can be pulled for facilitating assembly of the light source and the transformer in sequence. Then, the second fixing portion is released such that the constrainer can recover due to resilience, so as to stably engage with the light source and the transformer. Accordingly, functions of positioning and protection can be achieved.

In the second embodiment, the constrainer is made of conductive material. In the second embodiment, at first, the light emitting unit and the circuit board are fixed on the heat dissipating component to form the light source. Then, the transformer is disposed on the base, and the arc-shaped slot of the constrainer is utilized to abut against the transformer. Finally, the first fixing portion can simultaneously utilize the protruding structure and the sunken structure to embed in the heat dissipating component of the light source for completing assembly. In the third embodiment, the constrainer and the frame can be integrally formed. As assembling the backlight module in the third embodiment, at first, the transformer is sheathed on the second fixing portion, i.e. the U-shaped structure, of the constrainer. Then, the constrainer is fixed on the light source in a glued or a screwed manner for completing assembly. It should be noticed that a sunken slot can be formed on the heat dissipating component of the light source for constraining the two ends of the transformer cooperatively with the constrainer, so as to provide an advanced positioning. The constrainer in the third embodiment can be a plastic frame combined with the light source in a glued, screwed, engaging manner, and it depends on practical demands. In addition, the backlight module in the aforesaid embodiments can further include the sheathing portion to assist the constrainer to fix the transformer in a position corresponding to the light source. The constrainer of the present invention is disposed on the middle section of the transformer, while the sheathing portion is disposed on the two ends of the transformer for providing a more reliable fixing mechanism.

Compared to the prior art, the constrainer of the present invention can provide an easy assembly, so as to fix the transformer relative to the light source rapidly. Furthermore, the present invention can selectively utilize the resilient buckling structure or the U-shaped structure to cover and protect the transformer, so as to effectively prevent the transparent tube, which is often made by glass material, from damage due to collision. It can design size of the constrainer of the present invention in advance for achieving a better precision of positioning. Furthermore, the inner surface of the constrainer can be coated with the reflective film, or alternatively, a reflective component can be disposed on contact surface between the constrainer and the transformer for enhancing light emitting efficiency of the backlight module.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A backlight module, comprising:
    a light guiding plate;
    a light source;
    a transformer detachably disposed between the light guiding plate and the light source, the transformer being for transforming a first beam emitted from the light source into a second beam, so as to transmit the second beam into the light guiding plate, wherein a spectrum of the first beam is different from a spectrum of the second beam; and
    a constrainer detachably connected to the light source for constraining a movement of the transformer, the constrainer comprising:
        a first fixing portion disposed on the light source; and
        a second fixing portion connected to the first fixing portion, the constrainer being adapted to detachably buckle the transformer via the second fixing portion to fix the transformer relative to the light source, the second fixing portion comprising two constraining blocks for respectively abutting against two opposite lateral surfaces of the transformer in a tight fit manner.

2. The backlight module of claim 1, wherein the light source comprises a bridging component, and the constrainer is fixed on the bridging component to connect the light source.

3. The backlight module of claim 1, wherein the transformer comprises a light transforming component and a transparent tube, and the light transforming component is accommodated inside the transparent tube.

4. The backlight module of claim 1, wherein the first fixing portion is a sunken structure for buckling the light source.

5. The backlight module of claim 1, wherein the constrainer is a symmetric structure, the symmetric structure comprises one first fixing portion and two second fixing portions, and the symmetric structure fixes an end of the light source and ends of the transformer.

6. The backlight module of claim 1, wherein the constrainer is a buckling structure made of resilient material, the buckling structure buckles the light source and a section of the transformer in a resiliently bending manner.

7. The backlight module of claim 1, wherein the first fixing portion is a protrusion embedded in a slot of the light source.

8. The backlight module of claim 1, wherein the first fixing portion is a slot embedded with a protrusion of the light source.

9. The light guiding plate of claim 1, wherein the second fixing portion is an arc-shaped slot, a curvature of the arc-shaped slot is substantially identical to a curvature of an edge of the transformer, and the arc-shaped slot abuts against the edge of the transformer for clamping the transformer cooperatively with a base of the light source.

10. The backlight module of claim 9, wherein the constrainer is made of heat conductive material, and the constrainer is combined with the light source and the transformer in a tight fit manner.

11. The backlight module of claim 5, wherein the second fixing portion contacts part of the edge of the transformer, so as to reduce shielded areas of a light-incidence side and a light-emitting side of the transformer.

12. The backlight module of claim 11, wherein the backlight module further comprises a reflective component disposed between the second fixing portion and the transformer.

13. The backlight module of claim 1, wherein the first fixing portion is a plate structure fixed on the light source in a glued or screwed manner.

14. The backlight module of claim 1, wherein the second fixing portion is a U-shaped structure, and the transformer is accommodated inside the U-shaped structure.

15. The backlight module of claim 14, wherein the backlight module further comprises a plurality of light sources, the constrainer further comprises a plurality of second fixing portions, and each of the second fixing portions sheathes on the transformer in a position aligned with a gap between the two adjacent light sources.

16. The backlight module of claim 1, wherein the constrainer further comprises a sheathing portion sheathing an end of the transformer and disposed on a back plate of the backlight module.

17. The backlight module of claim 1, wherein the constrainer further comprises a third fixing portion connected to the first fixing portion, and the third fixing portion abuts against a surface of the light guiding plate.

18. The backlight module of claim 1, wherein a reflective film is coated on an inner surface of the constrainer near the light source.

* * * * *